United States Patent [19]

Schwerzel et al.

[11] Patent Number: 4,800,425

[45] Date of Patent: Jan. 24, 1989

[54] SYSTEM FOR DISPLACEMENT VECTOR SEARCHING DURING DIGITAL IMAGE ANALYSIS

[75] Inventors: Wolfgang Schwerzel, Erbach; Georg Kummerfeldt, Neu-Ulm, both of Fed. Rep. of Germany

[73] Assignee: Licentia Patent-Verwaltungs-GmbH, Frankfurt am Main, Fed. Rep. of Germany

[21] Appl. No.: 134,872

[22] Filed: Dec. 18, 1987

[30] Foreign Application Priority Data

Dec. 24, 1986 [DE] Fed. Rep. of Germany ....... 3644407
Jun. 26, 1987 [DE] Fed. Rep. of Germany ....... 3721074

[51] Int. Cl.$^4$ ...................... H04N 7/137; G06F 15/70
[52] U.S. Cl. ..................................... 358/136; 358/105
[58] Field of Search ................................ 358/136, 105

[56] References Cited

U.S. PATENT DOCUMENTS

| | | | |
|---|---|---|---|
| 3,632,865 | 1/1972 | Haskell | 358/136 |
| 3,840,698 | 10/1974 | Hinoshita | 358/136 |
| 4,047,221 | 9/1977 | Yasuda | 358/136 |
| 4,460,923 | 7/1984 | Hirano et al. | 358/136 |
| 4,562,468 | 12/1985 | Koga | 358/136 |

FOREIGN PATENT DOCUMENTS

123616A1 10/1984 .
0180446 5/1986 European Pat. Off. .
3328341A1 2/1985 Fed. Rep. of Germany .

OTHER PUBLICATIONS

VALVO Publications, "8X 400 Microcontroller Family," (1985) 41 pages.
Dharma P. Agrawal, "A Pipelined Pseudoparallel System Architecture for Motion Analysis," The 8th Annual Symposium on Computer Architecture (May 1981) pp. 21–35.
Hideo Kuroda et al., "An Interframe Coding System Using Motion-Compensation Prediction and Uncovered Background Prediction," Electronics and Communications in Japan (Jan. 1985), pp. 65–74.
Kou-Hu Tzou et al., "Block-Recursive Matching Algorithm (BRMA) for Displacement Estimation of Video Images", IEEE International Conference on Acoustics, Speech, and Signal Processing (Mar. 1985) pp. 359–362.
Ram Srinivasan et al., "Predictive Coding Based on Efficient Motion Estimation," IEEE Transactions on Communications, (1985) pp. 888–896.
C. V. Ramamoorthy et al, "Pipeline Architecture," Computing Surveys, vol. 9, No. 1, Mar. 1977, pp. 61–101.

Primary Examiner—Howard W. Britton
Attorney, Agent, or Firm—Spencer & Frank

[57] ABSTRACT

In a system for displacement vector searching in digital image analysis, sub-totals of the amount differences in gray value for the pixel data of two images are calculated in parallel for more than one pair of pixels. These sub-totals are subsequently added together in an accumulator unit. In a control computer connected to the accumulator unit, the displacement vector is determined by selecting the minimum of a number of such added values.

8 Claims, 12 Drawing Sheets

SYSTEM FOR DISPLACEMENT VECTOR SEARCHING DURING DIGITAL IMAGE ANALYSIS

BACKGROUND OF THE INVENTION

The present invention relates to a system for displacement vector searching in digital image analysis, and more particularly to a displacement vector searching system of the type wherein pixel data for two successive images are divided into a regular block grid, the pixel data including digitalized gray values for the pixels, and wherein the blocks are used to determine displacement of associated blocks in the successive images by forming sums of the amount differences of subquantities of the pixel data of associated blocks, determining the minimum of these sums to find the best correlation of gray value peaks, and from this determining the displacement vectors of the blocks.

For the transmission of video scenes by telephone at transmission rates between 64 kbit/s and 384 kbit/s, prediction coding methods are employed. Prediction coding utilizes the information already existing at the receiver to describe the current image with the least amount of information. Prediction coding is improved considerably if the changes from image to image due to movement in the scene are detected in space and time and are included in the calculation of the predicted image (prediction coding with motion compensation). Prior art methods for motion compensation are, for example, the block-wise motion compensation disclosed in European Patent application No. 0,123,616 and the object specific motion compensation disclosed, for example, in German Offenlegungsschrift (unexamined published application) No. 3,328,341. These methods have in common that two images composed of digitalized pixels for luminance and chrominance are compared with one another essentially pixel by pixel. For this purpose, the digitalized images are divided into regular block grids.

In block-wise motion compensation, the entire image to be predicted is processed schematically (iconic image processing). Each n-pixel by n-pixel (that is, n x n) block of the regular block grid has an associated image-to-image displacement, in which a distance measure between the gray value peaks of the current block and the gray value peaks of a correspondingly displaced block in the preceding image is at a minimum or in which a measure of similarity between the grey value peaks of the current block and the gray value peaks of a correspondingly displaced block in the preceding image is at a maximum.

For object specific motion compensation, adjacent moving (displaced) blocks are combined into so-called objects and their movement is described by at least one motion vector (displacement vector) which characterizes the movement of the object.

Figure 1A:
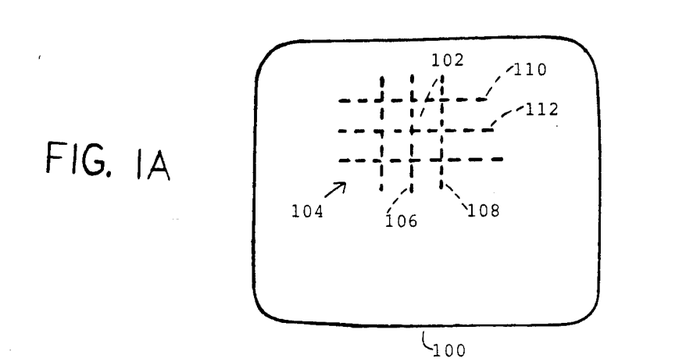
FIGS. 1A through 1C are explanatory diagrams which are employed to explain the block displacement vector.

Finding the block displacement on the basis of a minimum distance measure will be explained in more detail with reference to FIGS. 1A through 1C. In FIG. 1A, the screen 100 of a cathode ray tube displays a rapid sequence of images. The currently-displayed image is divided into blocks such as block 102 by an imaginary grid 104, only a portion of which is shown. Imaginary grid lines 106, 108, 110, and 112 border block 102 and separate it from adjacent blocks. Block 102 has n rows and n columns of pixels.

Figure 1B:
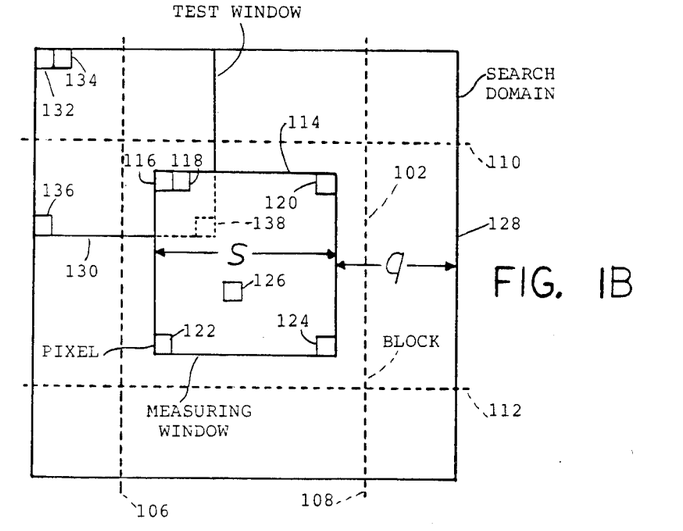
Figure 1C:
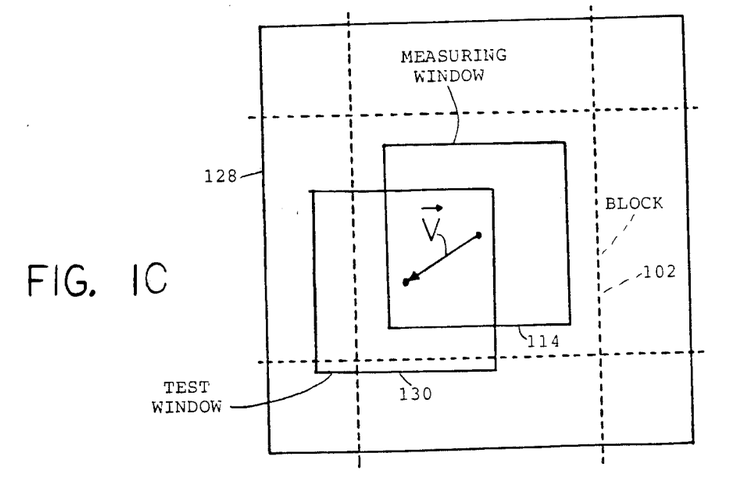

In FIG. 1B, a concentric subquantity of the block 102 in the current image (hereafter referred to as measuring window 114) is determined. Measuring window 114 has s rows and s columns of pixels (where $s \leq n$), although only pixel 116 (at position 0,0 within measuring window 114), pixel 118 (at position 1,0) pixel 120 (at position s-1,0), pixel 122 (at position 0, s-1), pixel 124 (at position s-1, s-1), and pixel 126 (at an arbitrary position i,k, where the index i identifies a column and the index k identifies a row) are shown. Reference number 128 designates a search domain disposed around block 102, search domain 128 having 2q+s rows and 2q+s columns of pixels, and reference number 130 designates a test window which is moved within search domain 128. Like measuring window 114, test window 130 has s rows and s columns of pixels, although only pixel 132 (at position 0,0 within test window 130), pixel 134 (at position 1,0), pixel 136 (at position 0, s-1), and pixel 138 (at position s-1, s-1) are shown. However unlike measuring window 114, which represents pixels in the current image, test window 130 (and search domain 128) represents pixels of the prior image.

For each position of test window 130 within search domain 128, the gray values of the current-image pixels of measuring window 114 are compared with the gray values of the prior-image pixels of test window 130 to provide a sum V of the difference amounts. More precisely, for each test window position $$V_o = \sum_{i,k=0}^{s-1} |a_{ik} - b_{ik}| \quad (1)$$

In Equation (1), $a_{ik}$ is the digital gray value of the pixel in the current image, $b_{ik}$ is the digitalized gray value of the pixel in the preceding image, and the subscript "0" (in the term "$V_o$") refers the sum V when test window 130 is in its initial position in the center of block 102. In Equation 1 and elsewhere in the present application, the first index (i) indicates a column and the second index (k) indicates a row.

In view of Equation 1, when test window 130 is in the position as illustrated the sum V is found by summing the absolute value of the difference in gray values between pixel 116 and pixel 132, . . . , the absolute value of the difference in gray values between pixel 122 and pixel 136, the absolute value of the difference in gray values between pixel 118 and pixel 134, . . . , and the absolute value of the difference in gray values between pixel 124 and pixel 138. To find the next sum test window 130 is moved by one pixel to the right, for example, so that pixels 132 and 136 are no longer within test window 130, and pixel 134 becomes the prior-image pixel at position (0,0) within test window 130. The sum of the absolute values of the difference between gray values for the current and prior pixels is then found again in accordance with Equation 1. This procedure continues until test window 130 has been examined at every position within search domain 128, when the so-called full search is applied.

The search range defined by search domain 128 in the preceding image extends by $\pm q$ pixels in the x and y directions concentrically around the undisplaced measuring window 114. The distance value minimum to be found is one of $(2q+1)^2$ possible values $$V_d = \sum_{i,k=0}^{s-1} |a_{ik} - b_{lm}| \qquad (2)$$

where the indices l and m are a function of the displacement of the measuring window.

Instead of using all pixels within a measuring window for the calculation of the sum of the differences, a subquantity selected according to the above sample may also be employed so that fewer calculation operations need to be performed.

By determining the minimum $V=V_{min}$ of the $(2q+1)^2$ values of V, a vector is defined which extends from the center of the block 102 in the current image to the center of the test window 130 of the prior image at some particular position of test window 130. In the example shown in FIG. 1C, it is assumed that $V_{min}$ occurs when test window 130 is positioned as illustrated. This represents the displacement of a block in two timely consecutive images. This vector is called the displacement vector $\overline{V}$ and the described method of finding the minimum of the distance measure of two blocks is called a displacement vector search.

While the foregoing discussion has been presented in terms of images which are being displayed on a screen, it will be apparent to those skilled in the art that the discussion is applicable in general to video information before it is displayed.

SUMMARY OF THE INVENTION

It is an object of the invention to determine the values V and the displacement vector $\overline{V}$ in real time with an electronic arrangement in the form of a monolithic integrated circuit.

This is accomplished by a system which includes an array unit having a plurality of pixel data inputs in which for each correlation determination the sum of the amount differences for more than one associated pixel pair is calculated in parallel; an accumulator unit in which the sums of the amount differences are added to one another, the accumulator unit being connected to the array unit; and a control computer connected to the accumulator unit to determine the components of the displacement vectors by determining the minimum of the sum of the amount differences added together during each image displacement. The arrangement is essentially characterized by parallel processing and formation of the respective differences in amounts between associated pixels in the current image and the preceding image.

The problem of fast memory access in parallel data processing is solved by a specially organized memory which is characterized in that data of a word width N are written in serially and data of a word with M N, whose width is a whole number multiple of the written-in word width, are read out in parallel.

DESCRIPTION OF THE PREFERRED EMBODIMENTS

Figure 2:
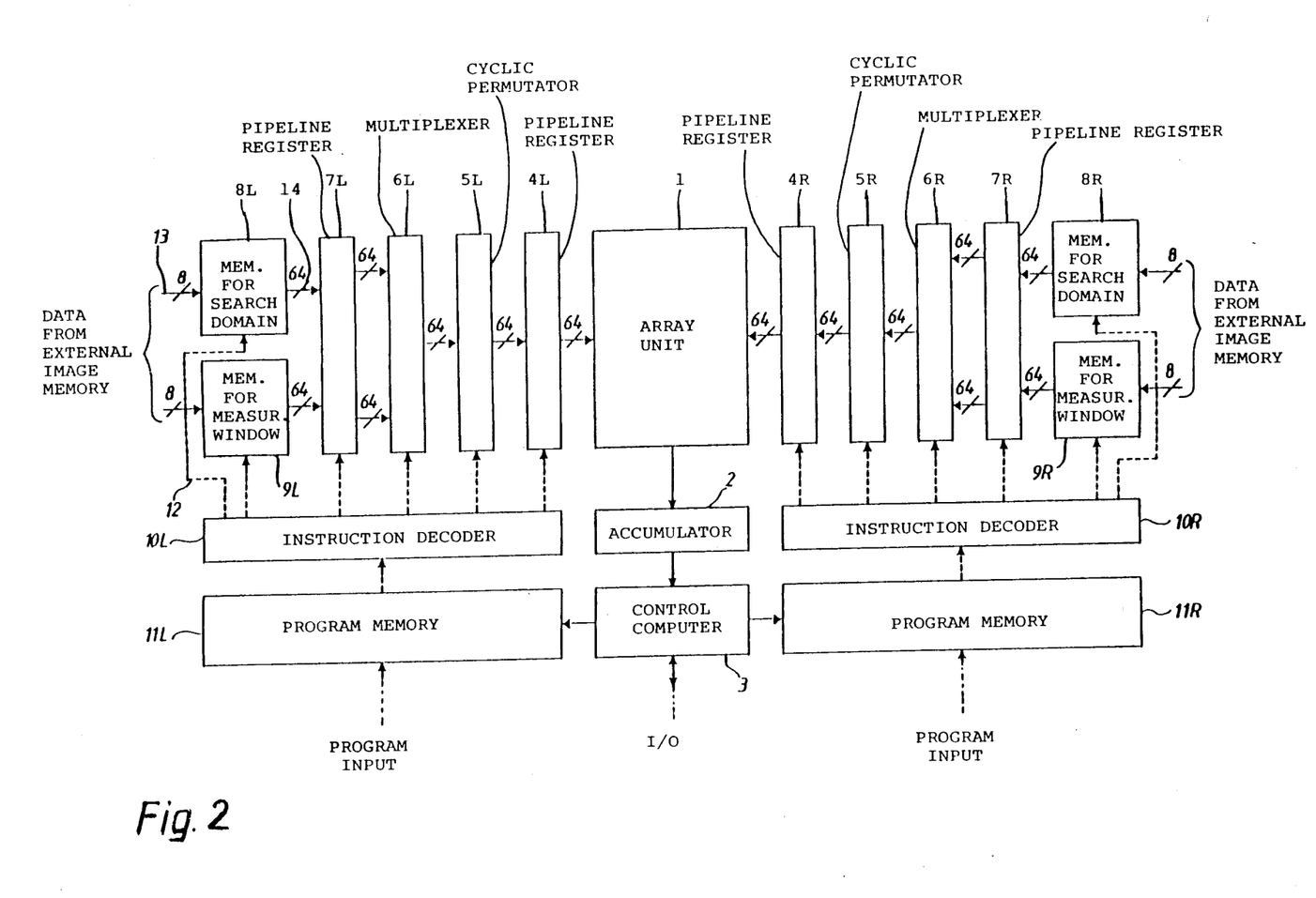
FIG. 2 is a block circuit diagram of a displacement vector searching system according to the invention.

The block circuit diagram of a displacement vector searching system in accordance with the invention is shown in FIG. 2. An array unit 1 is connected, via an accumulator 2, with a control computer 3. The control computer 3 is connected so as to receive and deliver data and is connected with two program memories 11L and 11R. Memories 11L and 11R each have a data input for feeding in a program and a data output for addresses. Each address output is connected with an instruction decoder 10L and 10R, respectively.

The outputs of instruction decoders 10L and 10R lead respectively to memories 8L and 8R for the search domain, to memories 9L and 9R for the measuring window, to first pipeline registers 7L and 7R, to multiplexers 6L and 6R, to cyclical permutators 5L and 5R, and to second pipeline registers 4L and 4R.

Memories 8L and 9L and 8R and 9R, respectively, are each connected by way of eight lines with external image memories (not illustrated) which store the complete images for which the displacement vectors are to be determined. Sixty-four output lines of memories 8L and 9L and 8R and 9R, respectively, lead to each of first pipeline registers 7L and 7R, respectively. 128 output lines of pipeline registers 7L and 7R, respectively, lead to each one of multiplexers 6L and 6R, respectively. 64 output lines of multiplexers 6L and 6R, respectively, lead to each of cyclic permutators 5L and 5R, respectively. 64 output lines of cyclic permutators 5L and 5R, respectively, lead to each one of the second pipeline registers 4L and 4R, respectively, and 64 output lines of each one of pipeline registers 4L and 4R lead to array unit 1.

Array unit 1 operates simultaneously on pixel data for eight pixel pairs, the data for one pixel of each pair coming from a measuring window memory (9L or 9R) and the data for the other pixel of each pair coming from a search domain memory (8L or 8R). Array unit 1 serves to perform the mathematical operation $\Sigma |a-b|$, and calculates sub-totals for eight subtraction and amount forming (that is, absolute value) operations in parallel. Here, as in Equation 2, the term a represents the gray value of a pixel in the current image and the term b represents the gray value of a pixel in the immediately-prior image.

The sub-totals calculated by array unit 1 for one searching step, i.e. for one position of the test window in the searching domain, are accumulated in accumulator 2 to provide a sum of the difference values in accordance with Equation 2. Each sum is then transferred to control computer 3, where the displacement vector $\vec{V}$ is determined from the minimum of the distance measure $V_{min}$, as described above.

The data (here gray values for the 8-bit pixels) are written pixel by pixel from external random access image memories (RAM, not illustrated) in which complete images are stored into the memories 8L and 8R for the search domain and the memories 9L and 9R for the measuring window. Read-out from memories 8L, 9L, 8R, and 9R occurs in the form of a data word having a width of 64 bits, with the data of eight adjacent pixels being read out in parallel and in a chain.

The arrangement operates in an alternating-side manner (change of memory operation), using only two memories at a time for the search domain and the measuring window. While the data from external image memories are written into memory 8L for the search domain and into memory 9R for the measuring window, the data from memory 8R for the search domain and memory 9L for the measuring window are being read out for further processing. With each successive searching step, that is, for each position of the test window in the search domain, these memory functions change.

Multiplexers 6L and 6R serve to switch the data paths during the above-mentioned memory changing operation. Cyclical permutators 5L and 5R re-arrange 4 bytes at a time in groups of 2×4 bytes. Such a cyclical rearrangement is necessary to correctly subtract the data of the pixels of the current image from those of the preceding image since, because of the organization of the memory, the data read out of the memory are also exchanged cyclically.

Pipeline registers 4L, 7L, 4R and 7R serve, in a known manner, to increase the data throughput rate*. Depending on the circuitry and technology employed, they may either be omitted or changed in number and/or implemented at another location in the arrangement. The arrangement includes a control. In the illustrated embodiment, this control is composed of an instruction decoders 10L and 10R, program memories 11L and 11R, and control computer 3. These circuits may also be combined in a control unit. Advantageously, the control can be programmed for different motion vector search algorithms.
*C. V. Ramamoorthy, H. F. Li, 'Pipeline Architecture', Computing Surveys, vol. 9, No. 1, March 1977, p. 64–102.

Figure 3:
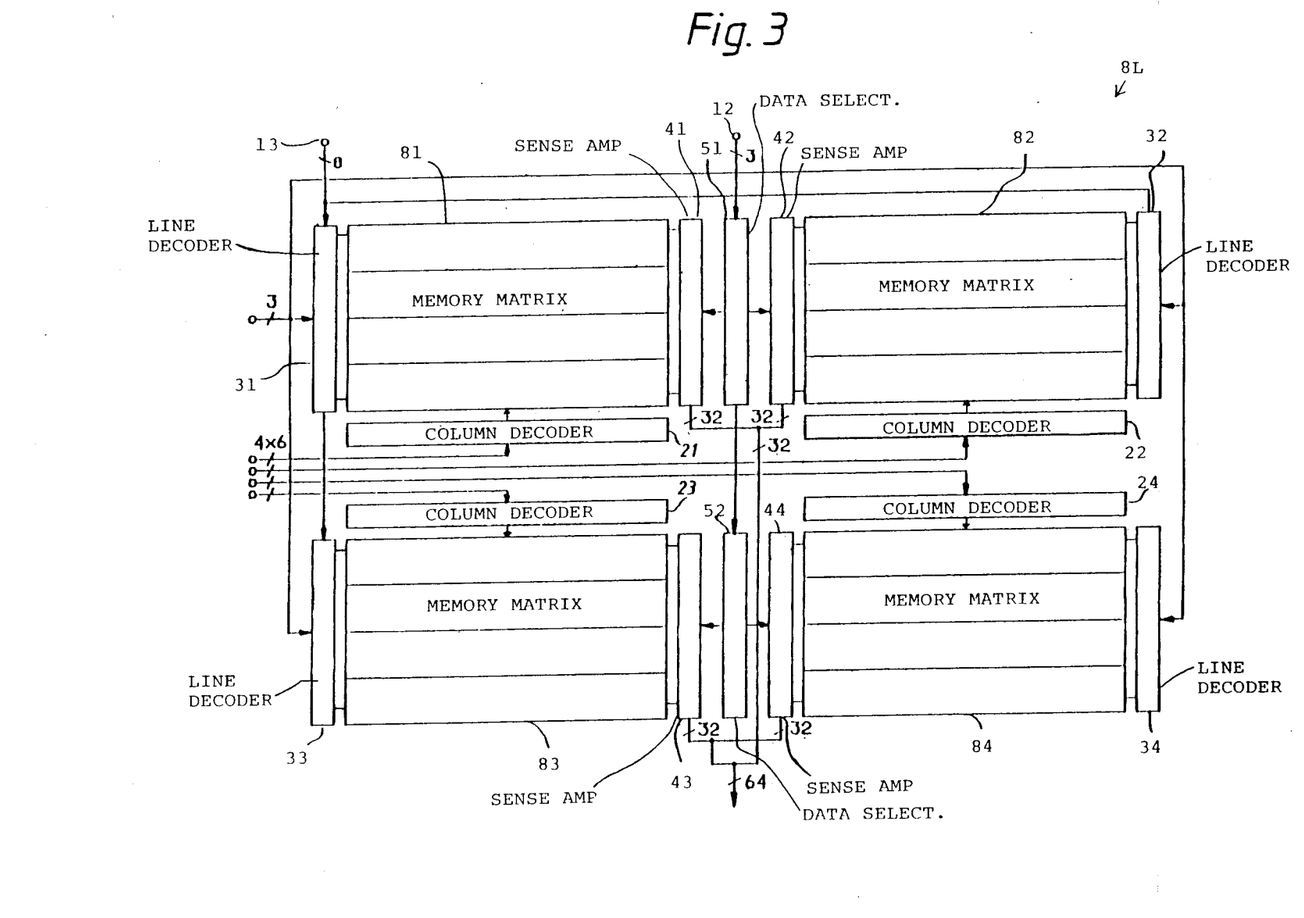
FIG. 3 shows the arrangement of the memory matrixes of a memory.

FIG. 3 shows the configuration of memory 8L. The configuration of memory 8R is the same, and memories 9L and 9R have similar configurations but smaller storage capacities. Memory 8L is composed of four memory matrixes 81 to 84 which are each provided with a column decoder 21, 22, 23 and 24, respectively, and a row or line decoder 31, 32, 33 and 34, respectively, as well as a sense amplifier 41, 42, 43 and 44, respectively. The data are written in from the external image memory (not illustrated) via line 13. Data selection circuits 51 and 52, controlled by instruction decoder 10L (FIG. 2) via lines 12, select 32 bits from the 64 bits of the decoded data addressed via lines 12 in columns in the right and left memory matrixes. These data are conducted via lines 14 (see FIG. 2) to pipeline register 7L.

Figure 4:
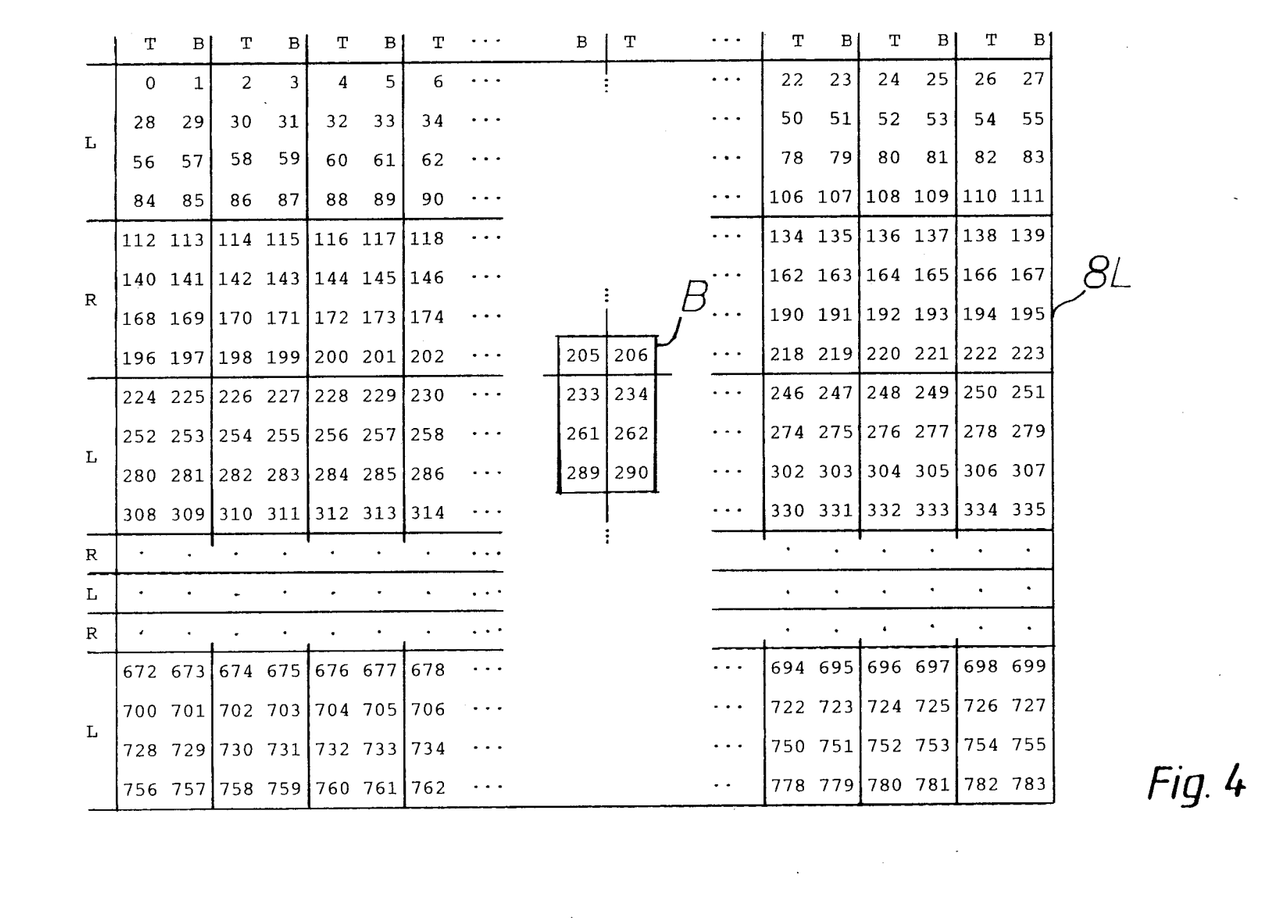
FIG. 4 shows a measuring domain including 28·28 pixels.
Figure 5:
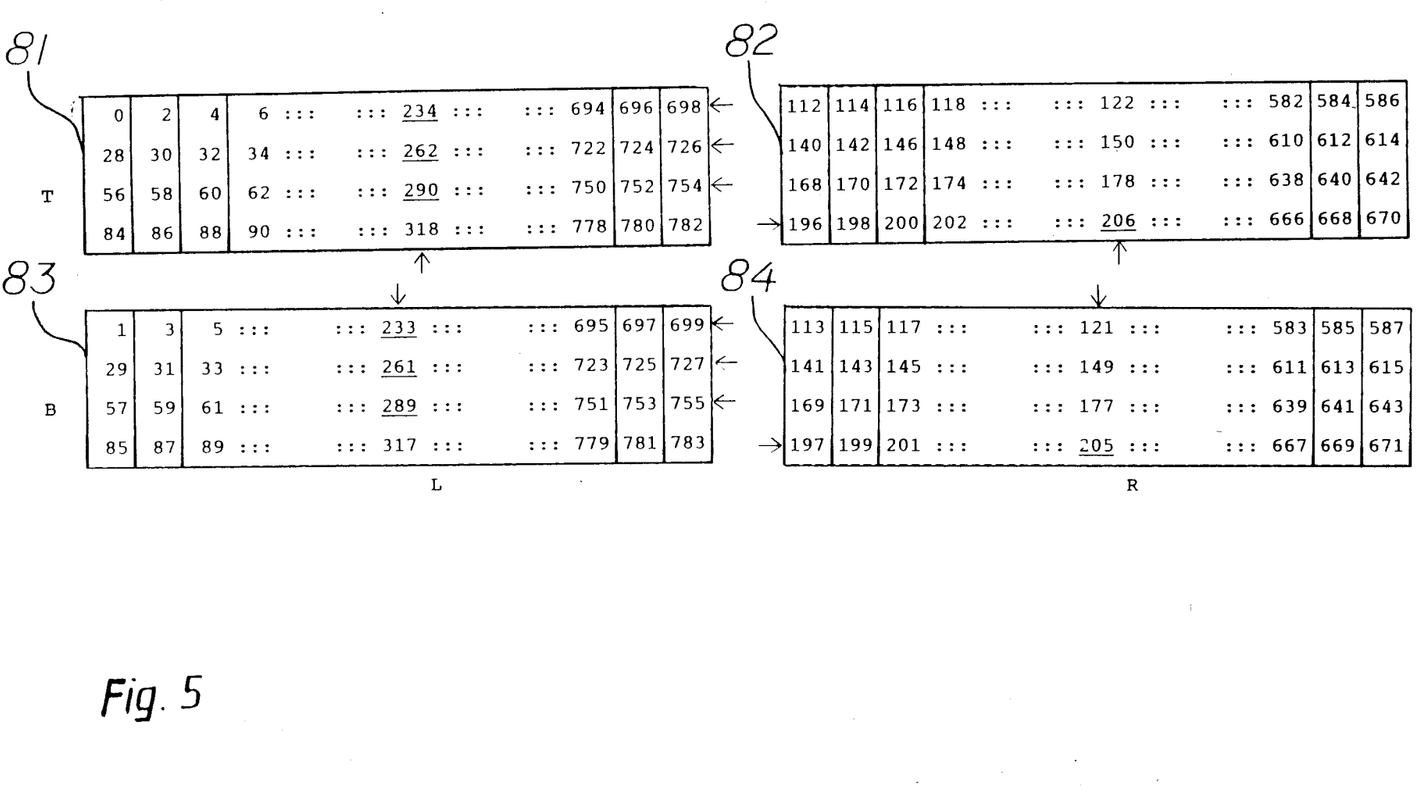
FIG. 5 is an example of the functions performed in reading out a memory.

FIGS. 4 and 5 show the content of memory 8L. Here, a numerical association is made between a search domain covering 28·28 pixels (that is, a square array of 784 pixels, numbered 0 through 783) and the physical memory cell. The position of the four memory matrixes 81 to 84 of memory 8L is identified in FIGS. 4 and 5 by L (left) and R (right), T (top) and B (bottom). The storage of pixels is effected in such a manner that, for read-out of eight adjacent pixels (framed region B in FIG. 4) arranged in a 2·4 matrix (2 pixels horizontally, 4 pixels vertically), column decoders 21 to 24 (FIG. 3) select only one column of each of the four memory matrixes. The selection of the rows of the digitalized gray values of the pixel data is effected by way of data selection circuits 51 and 52, which are connected with sense amplifiers 41 and 44.

Figure 6:
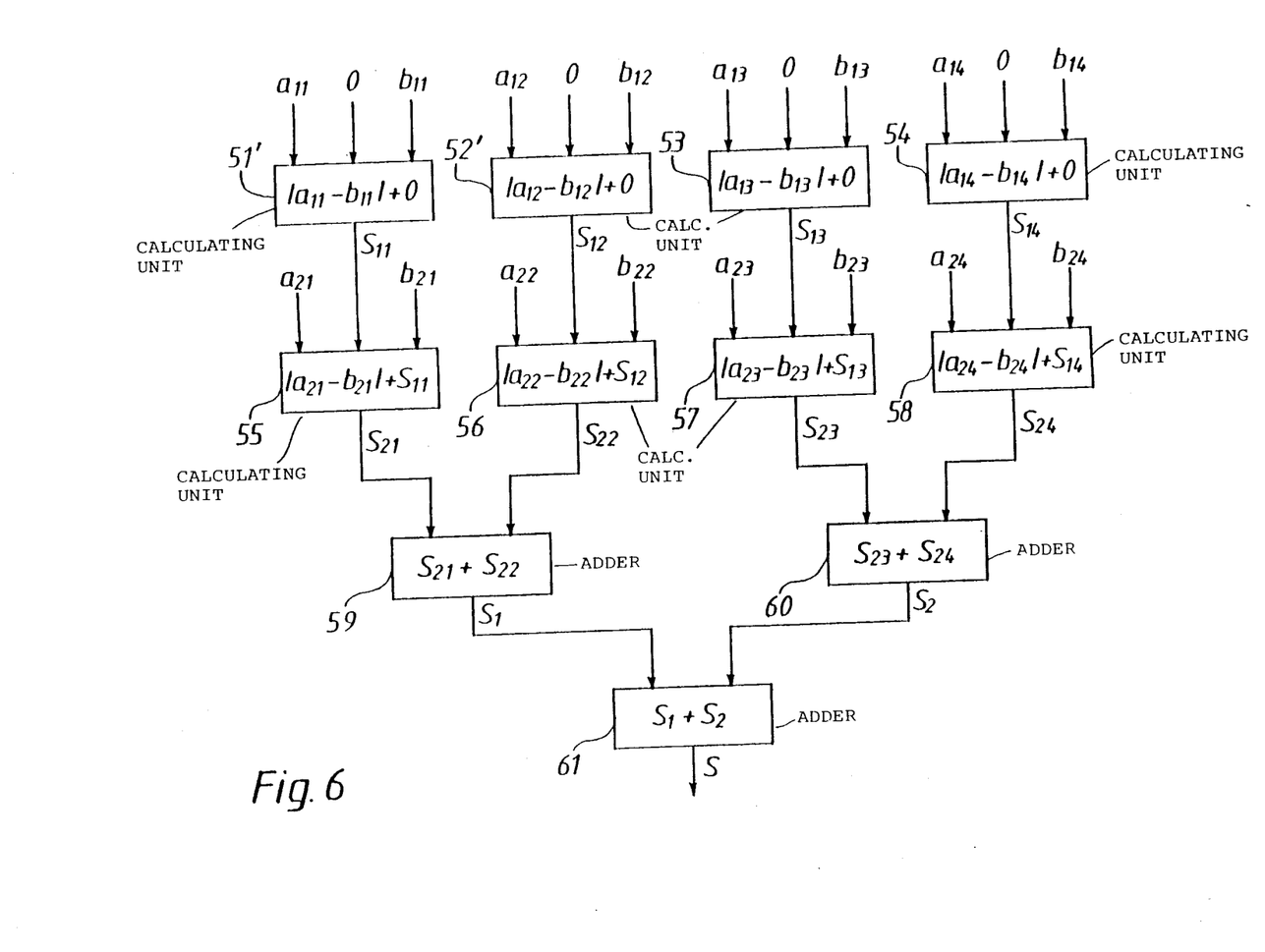
FIG. 6 is a flow diagram to describe the mode of operation of the array unit.

FIG. 6 shows the sub-total formation taking place in array unit 1 in the form of a flow diagram. The 8-bit, digitalized gray value of a pixel of the current image, derived for example from memory matrixes in measuring window memory 9R corresponding to memory matrixes 81 to 84, is $a_{ik}$ (i = 1, 2 and k = 1 to 4, where i identifies a column and k identifies a row). The digitalized, 8-bit gray value of a pixel of the preceding image, derived for example from memory matrixes 81 to 84 of memory 8L for the search domain, is marked $b_{ik}$ (i = 1, 2; k = 1 to 4). For example $b_{11}$, $b_{12}$, $b_{13}$, and $b_{14}$ might correspond to the gray values for pixels 205, 233, 261, and 289 in region B of FIG. 4, with $b_{21}$, $b_{22}$, $b_{23}$, and $b_{24}$ corresponding to the gray values for the second column of pixels in region B.

Calculating units 51', 52', 53, and 54 form the amount differences $|a_{11}-b_{11}|$ to $|a_{14}-b_{14}|$. Calculating unit 51', for example, has inputs to receive the eight gray value bits of pixel $a_{11}$, the eight gray value bits of pixel $b_{11}$, and zero (if desired), and provides an eight bit output $s_{11}$ corresponding to the absolute value of the difference in gray values of the pixel pair. The outputs of calculating units 51' to 54 are marked $s_{11}$ to $s_{14}$, respectively. Calculating units 55 to 58 add to the respective results the amount differences $|a_{21}-b_{21}|$ etc. to $|a_{24}-b_{24}|$. In this way, first partial results $s_{21}$ to $s_{24}$ are obtained.

In subsequent adders 59 and 60, second partial results $s_1 = s_{21} + s_{22}$ and $s_2 = s_{23} + s_{24}$ are formed and finally, in adding member 61, the sub-total $s = s_1 + s_2$.

$$s = \sum_{i=1}^{2} \sum_{k=1}^{4} |a_{ik} - b_{ik}| \qquad (3)$$

Figure 7:
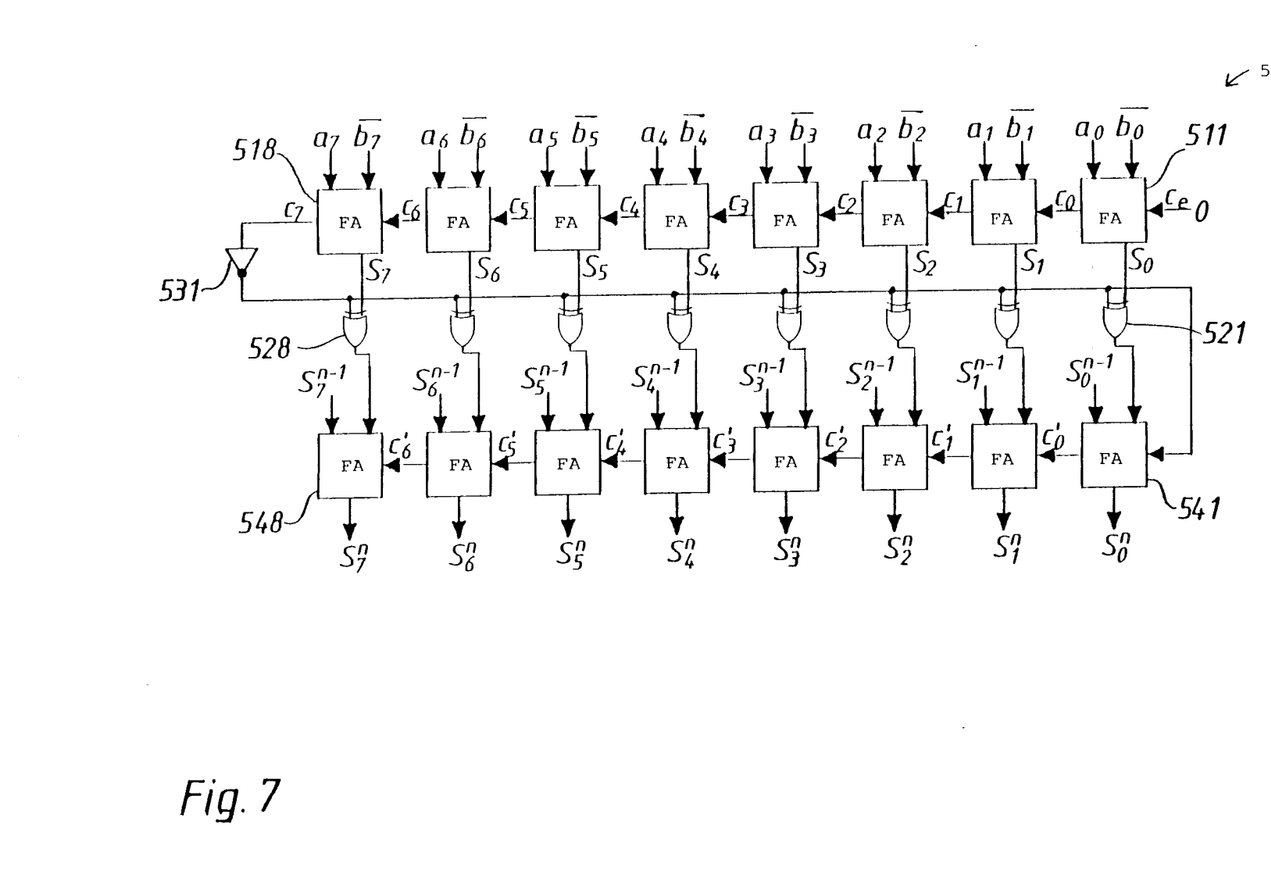
FIG. 7 shows a circuit for forming the differences in the amounts between two binary number.

FIG. 7 is a detailed view of a calculating unit, for example calculating unit 55, for forming the amount differences of two gray values having 8 bits, as it is performed in each of calculating units 51 to 58 of FIG. 6. For calculating unit 55, the eight bits $a_0$ to $a_7$ of gray value $a_{21}$ are each fed to the respective first inputs of the eight full adders 511 to 518 and the inverted eight bits $b_0$ to $b_7$ of gray value $b_{21}$ are fed to the second inputs of the eight full adders 511 to 518. The respective outputs of carry bits $c_0$ to $c_6$ of full adders 511 to 517 are each connected with the carry bit inputs of the adjacent full adders. The output for carry bit $c_7$ is connected, via an inverter 531, with all first inputs of eight exclusive-or gates 521 to 528 and with the carry bit input of one full adder 541 of eight further full adders 541 to 548.

The outputs of exclusive-or gates 521 to 528 are each connected with eight first inputs of the eight further full adders 541 to 548, each of whose respective second inputs receives one bit of the amount difference $s_{11}$ (in the case of members 51' to 54, this input is switched to binary "0"). The eight outputs of full adders 541 to 548 furnish the individual bits of partial result $s_{21}$.

The adding members 59 to 61 are known in the art, so that their description is not required.

The search step addresses for the arrangement shown in FIG. 2 are generated by means of program memories 11L and 11R and thus the desired pixel data (gray values) are read into the array unit 1 and are processed. As soon as control computer 3 reveals, after a given number of displacement vector searches, the smallest value for the output of adder 61 and its associated address, the control computer puts out the components for the displacement vector.

Figure 8:
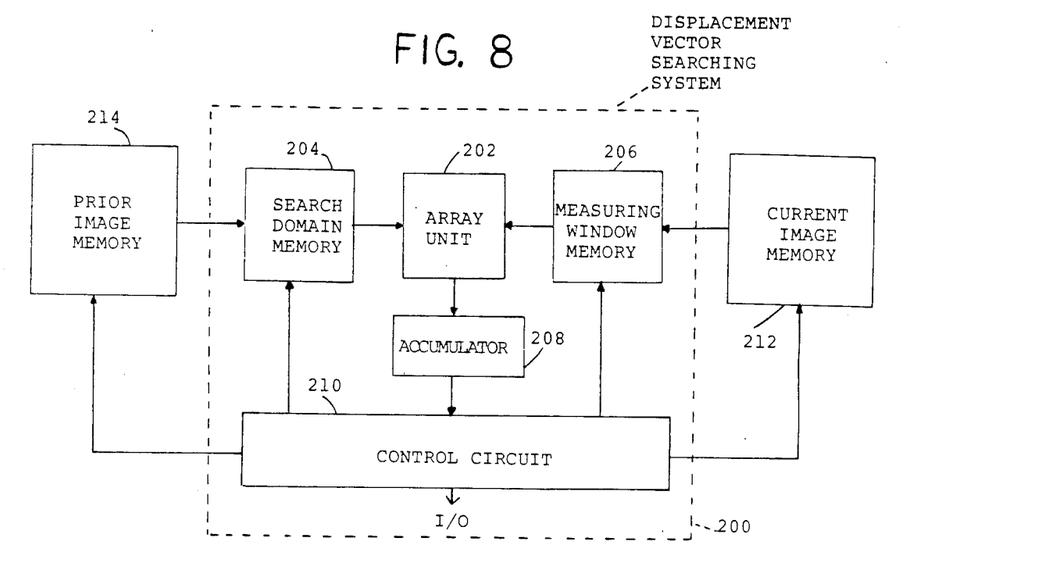
FIG. 8 is a block diagram illustrating a simplified second embodiment of the displacement vector searching system of the present invention.

FIG. 8 illustrates a simplified embodiment for use when very high speed components are available. Displacement vector searching system 200 includes an array unit 202 which is constructed in accordance with FIGS. 6 and 7, and processes the gray values for 8 pairs of bits simultaneously. System 200 also includes a search domain memory 204 which supplies pixel data to array unit 202, a measuring window memory 206 which also supplies pixel data to array unit 202, an accumulator 208 which receives from array unit 202 subtotals which are calculated in accordance with Equation 3, and a control circuit 210 which receives from accumulator 208 sums in accordance with Equation 1. Current image memory 212, as it name implies, is a frame memory which stores the current image, and prior image memory is a frame memory which stores the image immediately preceding the current image.

Figure 9:
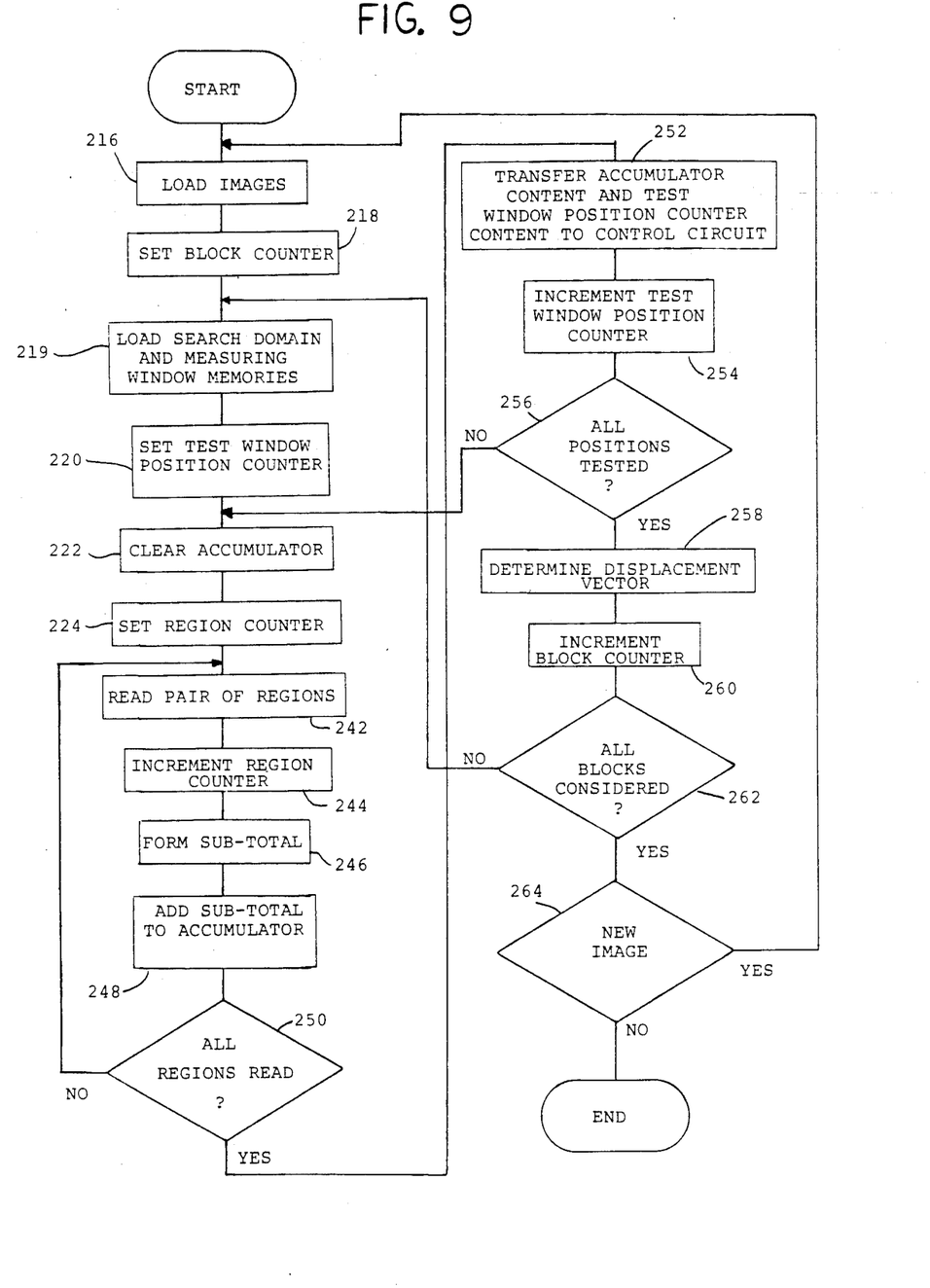
FIG. 9 illustrates a flow chart for operation of the embodiment of FIG. 8.

Operation of system 200 will be described with reference to FIG. 9. In step 216, the current and prior images are stored in memories 212 and 214, respectively. As has previously been discussed, the pixel data for the current image can be separated into a regular grid of blocks, and for each of these blocks there corresponds a search domain region in the prior image. Although the search domain regions overlap with adjacent search domain regions, nevertheless each search domain region of the prior image corresponds to a particular block of the current image. In step 218 a block counter (not illustrated) in control circuit 210 is set to identify the first block of the current image, and this also identifies the first search domain of the prior image. In step 219 the designated block from current image memory 212 is stored in measuring window memory 206 and the corresponding search domain from prior image memory 214 is stored in search domain memory 204. A test window position counter (not illustrated) in control circuit 210 is set in step 220 to designate the initial position of the test window within the search domain. As will become apparent, the test window is examined at different positions and compared with the measuring window.

Accumulator 208 is cleared in step 222. A region counter (not illustrated) in control circuit 210 is then set in step 224. The regions will be described in more detail with reference to FIGS. 10A and 10B.

Figure 10A:
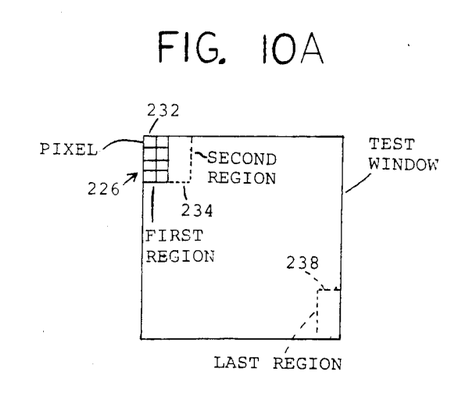
FIGS. 10A and 10B are explanatory diagrams illustrating different eight-pixel regions in memory.
Figure 10B:
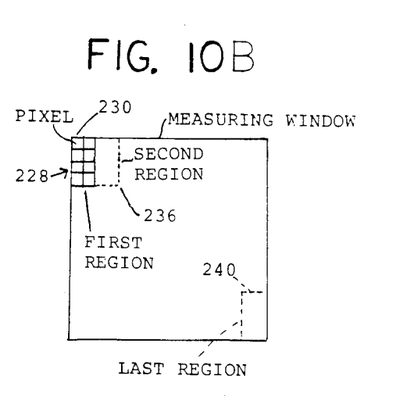

In FIGS. 10A and 10B, it will be apparent that the test window and measuring window each include a plurality of regions having two columns of four pixels. First region 226 of the test window corresponds to first region 228 of the measuring window. Pixel 230 of region 228 provides the value $a_{11}$ in Equation 3, and similarly pixel 322 of region 226 provides the value $b_{11}$ of Equation 3. After array unit 202 calculates the sum of the amount of the difference between the gray values of the pixels of first region 226 and the gray values of the pixels of the first region 228, second regions 234 and 236 are transferred simultaneously to array unit 202. This continues until last regions 238 and 240 are processed. Which of the regions are to be transferred to array unit 202 is determined by the content of the region counter.

Returning to FIG. 9, the pair of regions designated by the region counter are read out and transferred to array unit 202 during step 242, whereupon the region counter is incremented in step 244. Array unit 202 employs the circuitry of FIGS. 6 and 7 to generate a sub-total (step 246), as previously discussed, and the sub-total is transferred during step 248 to accumulator 208. After this transfer a check is made, in step 250, to determine whether the last regions have been read. If not, new regions are read out of search domain memory 204 and measuring window memory 206 at step 242. However if the last regions have been compared, it will be apparent that the accumulator holds a sum V in accordance with Equation 2. This sum and the test window position are transferred, in step 252, to control circuit 210. The test window position counter is then incremented in step 254 to shift, by one pixel, the position of the test window with respect to the search domain (this can be accomplished by updating a range of addresses for search domain memory 204). A check is then made at step 256 to determine whether the test window has been examined at all positions of the search domain, and if not the accumulator is cleared at step 222 and another sum in accordance with Equation 2 is calculated.

If all of the sums in accordance with Equation 2 have been calculated for the search domain, meaning that the measuring window has been compared to the test window everywhere within the search domain, control circuit 210 selects the minimum of the sums V in accordance with Equation 2 and generates the displacement vector on the basis of this minimum and the test window position at which the minimum was generated. This occurs in step 258. The program then continues to the next block of the current image and the corresponding search domain in the prior image (step 260), and in step 262 a check is made to determine whether the last block of the current image and the corresponding last search domain of the prior image have been compared. If not a new search domain and block, as determined by the block counter, are transferred to memories 204 and 206 (step 219. However if displacement vectors have already been generated for all of the blocks of the current image, in step 264 a check is made to determine whether a new image is ready. If so, the content of memory 212 is transferred to memory 214, and the new image is read into memory 212 so that displacement vectors can be determined for the new image with respect to what was previously the "current" image.

Instruction decoder, program memory, and control computer. The control circuit 210 of system 200 illustrated in FIG. 8 can either be realized as a dedicated circuit of a microcontroller circuit together with a RAM which are commercially available can be used. One way to realize the generation of addresses and control signals for the data processing part of the system is for example the application of the VALVO 8X400 microcontroller family which consists of 8X401 microcontroller, 8X450 RAM, and 8X470 I/O port. The microcontroller family can be accommodated to many sophisticated applications.

Figure 11A:
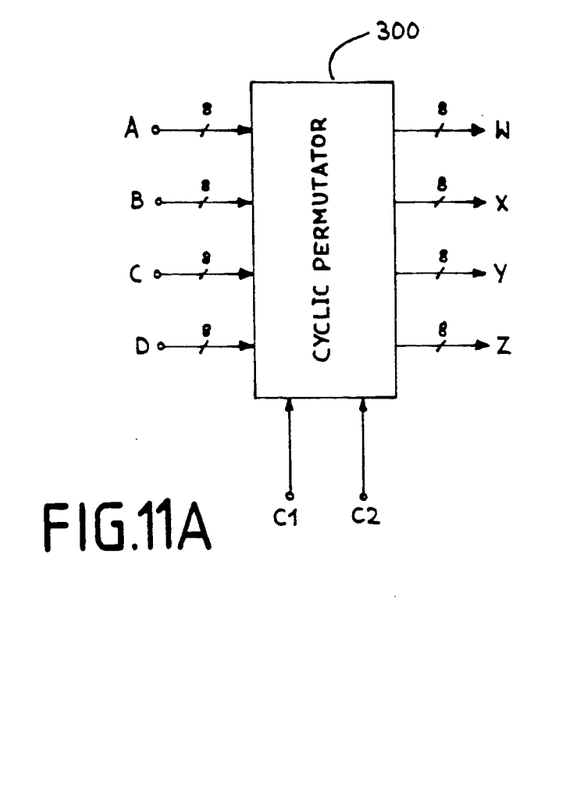
FIG. 11A is a block diagram of a cyclic permutator.

An example for one cyclic permutator 300 is illustrated as block diagram in FIG. 11A. For each of the cyclic permutators (5L, 5R) in FIG. 2 two of the circuits 300 are required. The input lines of the circuits 300 which are each 8 bit wide are denoted A, B, C and D the output lines are denoted W, X, Y and Z. The function of the circuit 300 is controlled by the control lines C1 and C2.

Figure 11B:
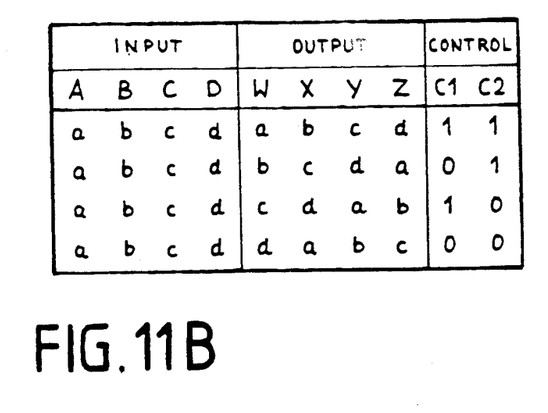
FIG. 11B shows the function of the cyclic permutator as a table.
Figure 11C:
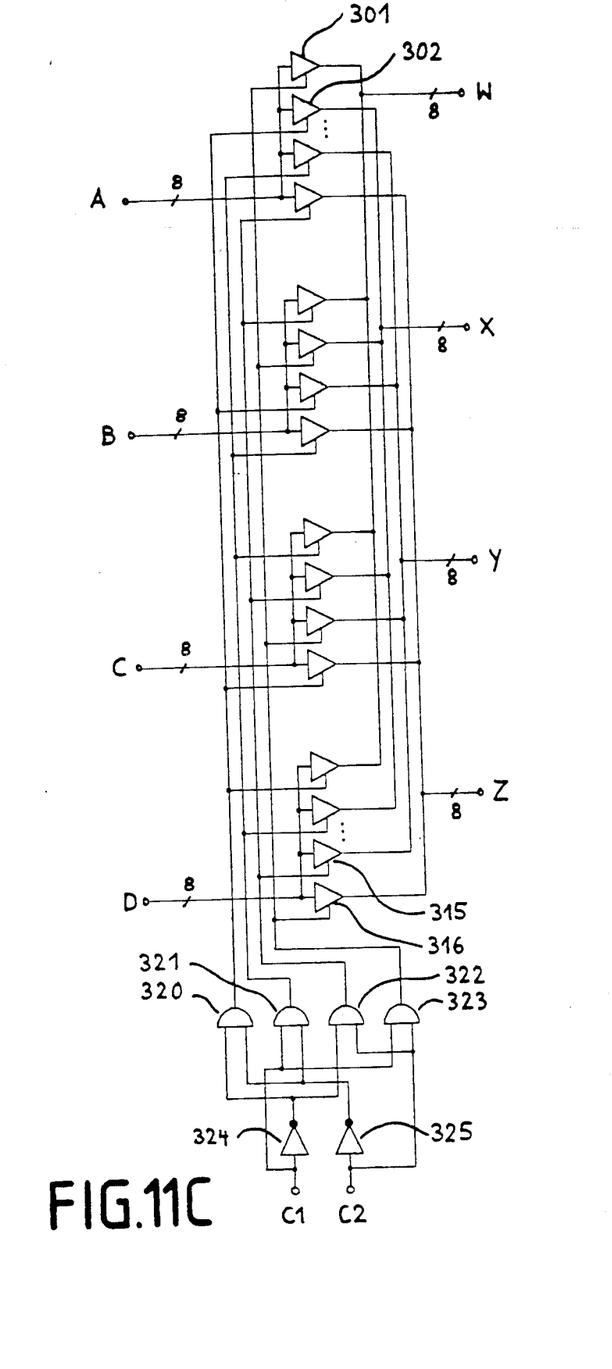
FIG. 11C illustrates a realization of a cyclic permutator.
Figure 11D:
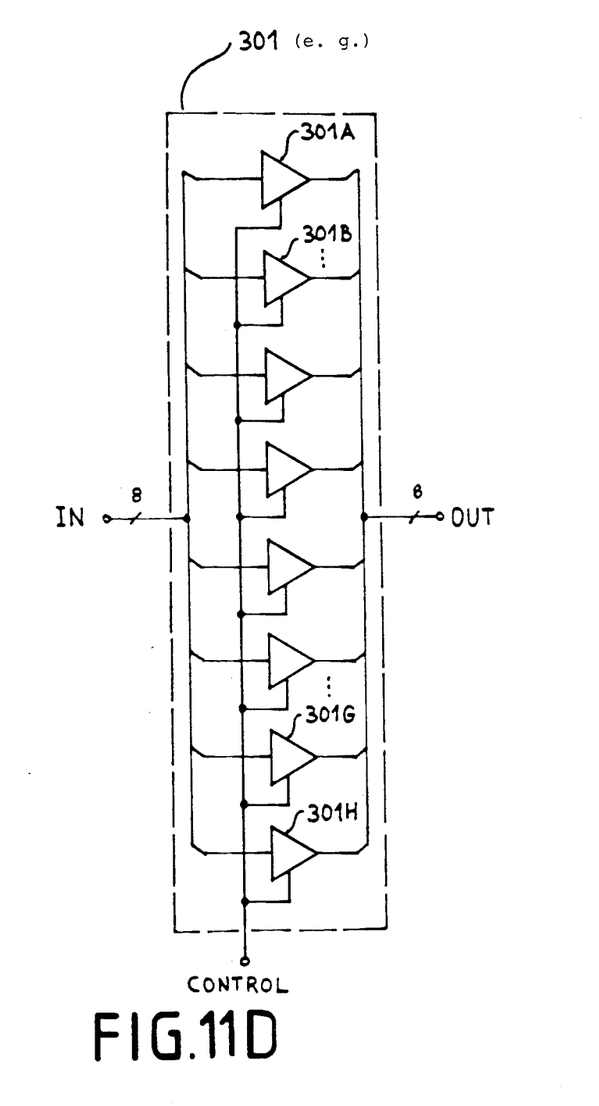
FIG. 11D is a detail of FIG. 11C and illustrates the tri-state driver circuit.

The function of the cyclic permutator is shown in the table in FIG. 11B when 8 bit wide input signals a, b, c, d and the control signals 0 and 1 are applied to the inputs A, B, C, D and the control lines C1, C2 respectively. A realization of the permutator 300 by means of tristate drivers is illustrated in FIG. 11C. Here each of the elements 301, 302, ..., 315 and 316 consists of 8 tristate drivers e.g. 301A, 301B, ..., 301G, 301H as shown in FIG. 11D having one common control line. When the control signal is logical 1 the drivers are active, in the case of logical 0 they are in a high-impedance state (high Z). The selection of the tristate drivers 301, ..., 316 is furnished by the logic circuit consisting of four AND-gates 320, ..., 323 and the inverters 324 and 325.

The present disclosure relates to the subject matter disclosed in Federal Republic of Germany application Nos. P 36 44 407.3, filed Dec. 24th, 1986, and P 37 21 074.2, filed June 26, 1987, the entire disclosures of which are incorporated herein by reference.

It will be understood that the above description of the present invention is susceptible to various modifications, changes and adaptations, and the same are intended to be comprehended within the meaning and range of equivalents of the appended claims.

What we claim is:

1. A system for displacement vector searches during digital analysis of a time-sequence of images having digitalized gray values, the displacement vector searches being conducted by dividing pixel data for a predetermined image in the sequence into a regular grid of blocks, and determining displacement of the blocks with respect to the image immediately earlier in the sequence, for each block the determination of the displacement including comparing a predetermined subquantity of the pixel data for the block with a plurality of corresponding subquantities of the pixel data for the earlier image to generate a plurality of sums of difference amounts between the gray values of the pixel data in the predetermined subquantity and the gray values of the pixel data in the corresponding subquantities, and selecting the minimum of the sums of the difference amounts, said system comprising:

array unit means, having a plurality of pixel data inputs, for calculating sub-totals of the difference amounts for a plurality of pixel pairs in parallel, each pixel pair including a pixel in the predetermined image and a pixel in the earlier image;

accumulator means, connected to the array unit means, for adding the sub-totals to one another to form the sums of the difference amounts; and control computer means, connected to the accumulator means, for determining the components of a displacement vector for each block by selecting the minimum of the sums of the difference amounts.

2. The system of claim 1, further comprising memory means for serially receiving pixel data having a word width N and for transferring pixel data to the array unit means in parallel, with a word width of N times M, where M is an integer greater than 1.

3. The system of claim 1, wherein the predetermined subquantity of pixel data corresponds to measuring pixels disposed in a predetermined pattern within a measuring window.

4. The system of claim 1, further comprising search domain memory means for serially receiving pixel data having a word width N and for transferring pixel data to the array unit means in parallel, with a word width of N times M, where M is an integer greater than 1, and measuring window memory means for serially receiving pixel data having a word width N and for transferring the pixel data to the array unit means in parallel, with a word width of N times M.

5. The system of claim 4, further comprising a first pipeline register, a first multiplexer, a first cyclic permutator, and another first pipeline register connected in series between the search domain memory means and the array unit means, and a second pipeline register, a second multiplexer, a second cyclic permutator, and another second pipeline register connected in series between the measuring window memory means and the array unit means.

6. The system of claim 5, wherein the control computer means is part of a programmable control circuit which is connected to the search domain memory means, to the measuring window memory means, and to the pipeline registers, multiplexers, and cyclic permutators.

7. The system of claim 6, further comprising an additional measuring window memory means for serially receiving pixel data having a word width N and for transferring pixel data in parallel, with a word width of N times M, the additional measuring window memory means being serially connected to the array unit means via the first pipeline register, first multiplexer, first cyclic permutator, and another first pipeline register, and an additional search domain memory means for serially receiving pixel data having a word width N and for transferring pixel data in parallel, with a word width of N times M, the additional search domain memory means being serially connected to the array unit means via the second pipeline register, second multiplexer, second cyclic permutator, and another second pipeline register.

8. The system of claim 6, wherein the programmable control circuit comprises an instruction decoder and a program memory in addition to the control computer means.

* * * * *